Feb. 5, 1957 A. W. JACKSON 2,780,012
MACHINE TRAINING DEVICE
Filed Nov. 22, 1954 2 Sheets-Sheet 1
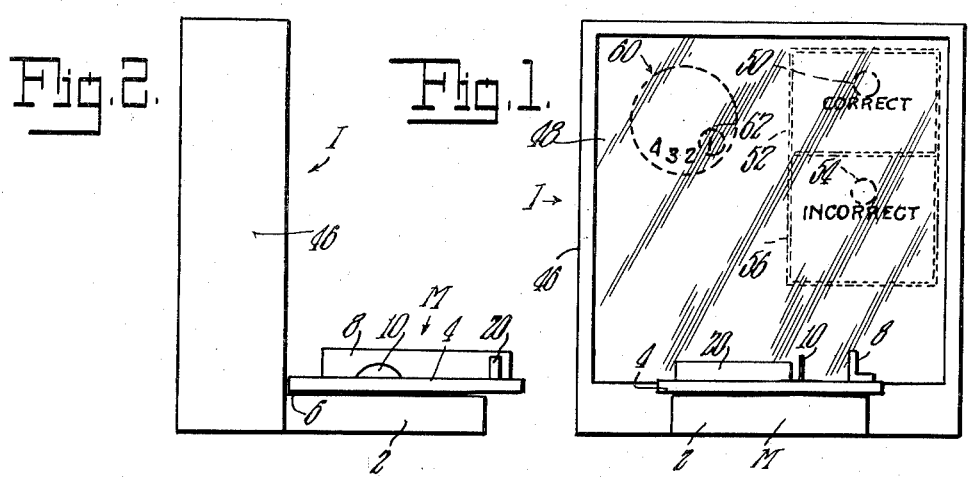
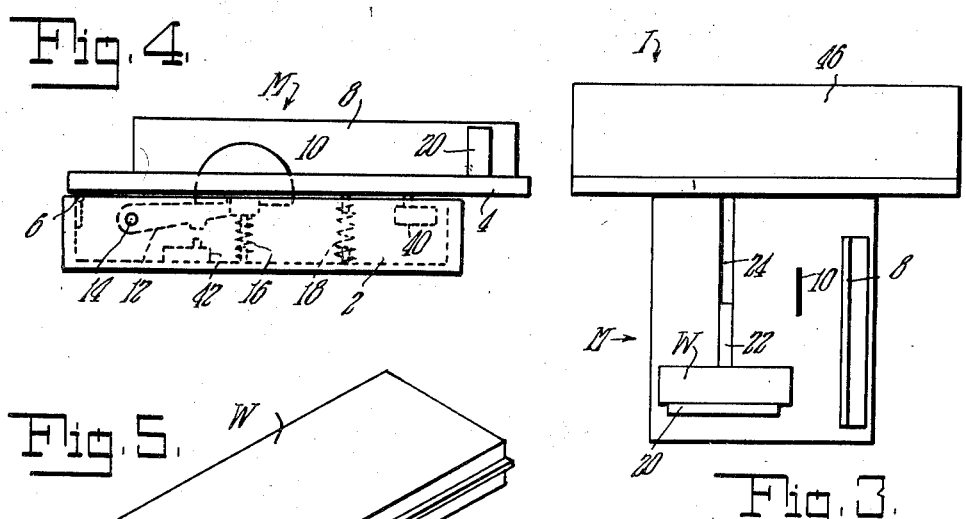
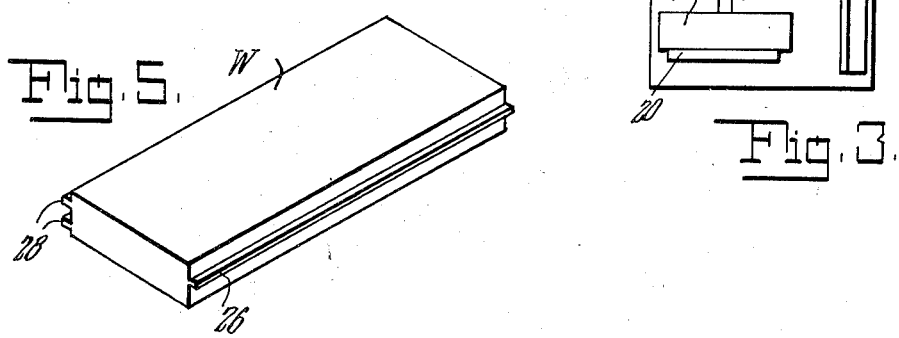
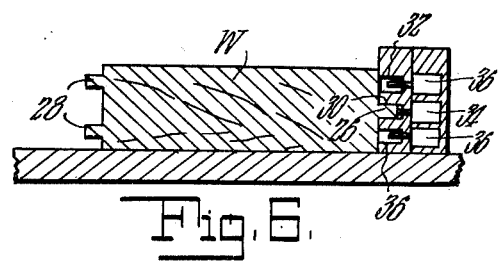
INVENTOR.
Arthur W. Jackson.
BY Rose + Roy
atty + agent

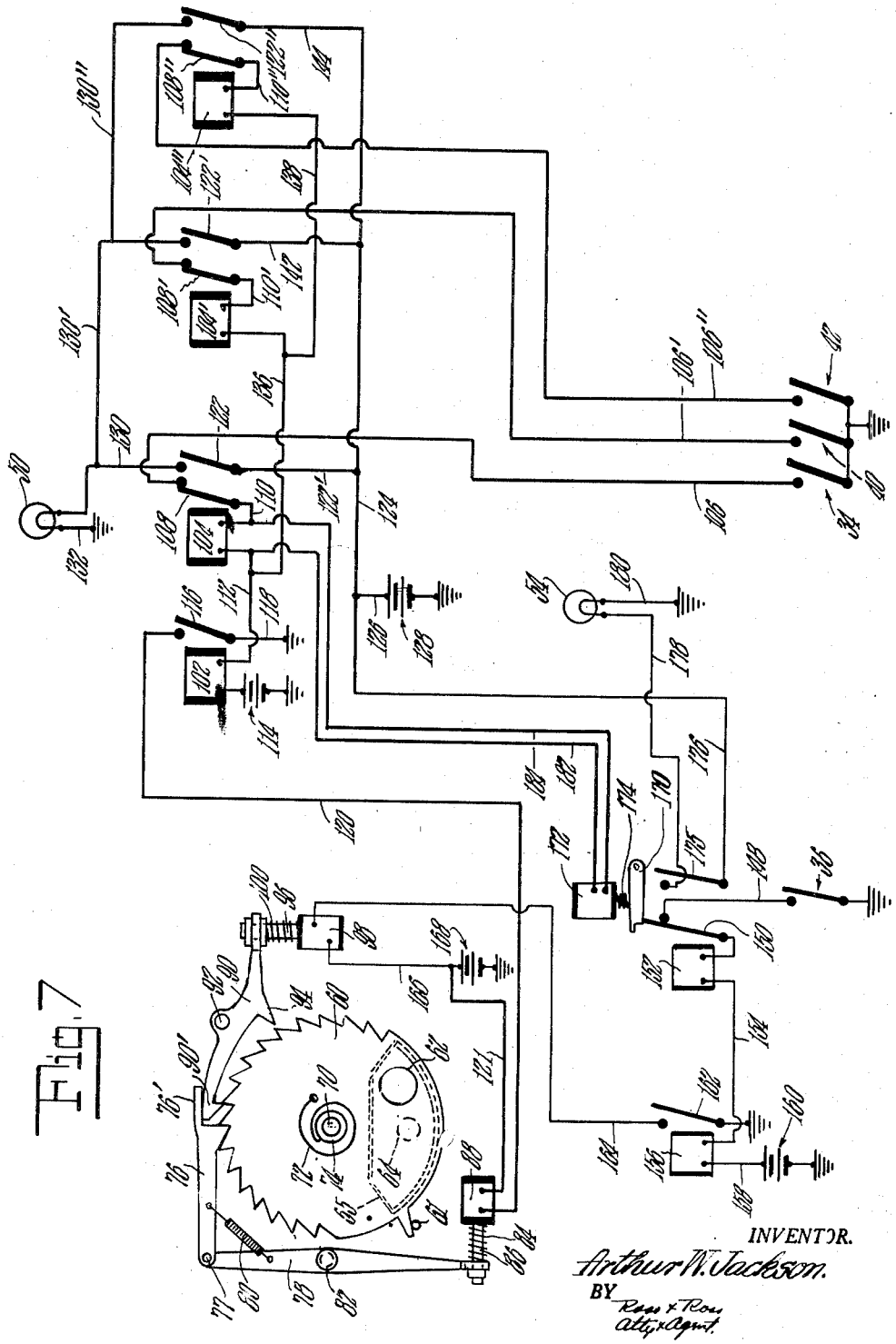

United States Patent Office 2,780,012
Patented Feb. 5, 1957

2,780,012

MACHINE TRAINING DEVICE

Arthur W. Jackson, Lake Placid, N. Y.

Application November 22, 1954, Serial No. 470,223

8 Claims. (Cl. 35—13)

This invention relates to improvements in training apparatus and is directed more particularly to apparatus constructed and arranged for training in the correct operation and use of all kinds of machines.

The principal object of the invention is the provision of apparatus for use in schools, manufacturing plants and the like. The apparatus is adapted for the teaching or training of students, workers and the like in the correct use and operation of a machine so that learners may become skilled and mindful of the hazards in connection with machine operation.

According to novel features of the invention, the apparatus includes a model machine, work piece, indicating means and circuit components which are responsive to the work piece as it is placed in the machine.

Various model machines may be employed and various procedures for explaining the use and the correct and safe operation of the machine may be established.

According to the established procedure in connection with a model machine of a certain kind or type, there will be certain correct and incorrect placements of the work piece in the machine. The circuit components will be responsive to the work piece and control or operate circuitry for indicating correct or incorrect placement of the work piece. Also according to the procedure, there will be members which are to be moved or shifted, as in a workable machine. Circuit components will be responsive to the shiftable members for indicating correct and incorrect operation.

The indicating means is arranged and controlled by the circuit components to give visual indications of the correct or incorrect placement of the work piece in the machine. According to one feature of the invention, the indicating means may show successive correct steps or operations and may indicate an incorrect step by cancelling a correct indication.

The indicating means may carry information and instructions relative to the correct and incorrect procedure and steps pertaining to the operation and safe use of a machine. Such information will be visible on panels of the indicating machine which may be changed for use with various model machines.

The model machine may be plugged into the indicating means for the completion of circuits including the responsive means of the model machine and indicating components and the plug-in mechanism may be such that various model machines may be connected to the indicating means.

The apparatus of the invention is adapted for broad application and may be used for trainng iin the correct and safe use and operation of a saw, lathe, planer, drill press or the like, wherefor it is not desired to be limited to the particular model machine hereinafter referred to.

All of the above cited objects, I accomplish by means of such structure and relative arrangement of parts thereof, as will fully appear by a perusal of the description below and by various specific features which will be hereinafter set forth.

To these above and other ends and with the foregoing and various other and ancillary features and advantages and objects of my invention as will become more readily apparent as the description proceeds, my invention consists in certain features of novelty, in a mode of operation, and in the combination, organization, and arrangement of parts as will be hereinafter more particularly pointed out in the claims hereunto annexed and more fully described and referred to in conjunction with the accompanying drawings wherein:

Fig. 1 is a front elevational view of training apparatus embodying the novel features of the invention;

Fig. 2 is a side elevational view of the apparatus shown in Fig. 1;

Fig. 3 is a plan view of the apparatus shown in Fig. 1;

Fig. 4 is a side elevational view of a model machine;

Fig. 5 is a perspective view of a work piece;

Fig. 6 is a sectional view through the work piece and cross cut guide of the model machine; and Fig. 7 is a diagrammatic view showing the circuitry of the apparatus.

Referring now to the drawings in detail, the novel features of the invention will be fully described.

In a general way, the apparatus of the invention includes a model machine M, indicated means I, and a work piece W.

The model machine M represents a saw but it will be understood that numerous other model machines come within the scope of the invention such as a model lathe, planer, drill press or the like.

There are correct and safe steps in the operation of any machine. In accordance with the invention, the work piece is arranged to coact with the model for training in the correct and safe use and operation of a machine.

When the work piece W is correctly placed in the machine, this correct placement is indicated by the indicating means I. When the work piece is incorrectly placed, such placement or error is indicated. That is, an error occurs and it is so indicated. Correct or incorrect placement of the work piece results in the operation of circuit control means whereby the indicating means so indicates.

As correct steps are made, the indicating means indicates or scores such steps. When the work piece is incorrectly placed in the machine, the same is indicated. According to one feature of the invention, an incorrect placement, or error, cancels a point of the score indicated.

There is circuit control means to indicate correct and incorrect placement in the machine and it will be understood that, in the practice of the invention, there may be as many of each as is desired, those hereinafter referred to being for illustration purposes only.

The machine M includes a bed 2, a table 4 hinged at 6 at its rear end to the bed, and a ripping fence 8 is disposed on the table 4. The representation of a saw 10 extends through a suitable slot in the table and is fixed to a lever 12 which is swingable on a pivot 14. A spring 16 urges the lever and saw upwardly and a spring 18 urges the table 4 slightly upwardly of the bed 2. A guide 20 has a tongue 22 slidable in a groove 24 of the table 4.

The work piece W has along one side thereof what may be called a correct tongue 26 and on its opposite side spaced incorrect tongues 28. The inner face of the guide 20 has a central correct groove 30 and incorrect upper and lower grooves 32, all adapted to receive the tongues.

Switches are disposed in the guide 20. These may be of the well known microtype having depressible actuating members which are spring pressed outwardly in circuit open position. A point or correct switch is indicated by 34 and error, or incorrect switches are indicated by 36. One of the incorrect switches is shown in Fig. 7.

A similar switch 40 is provided in the bed 2 for actuation by the table 4 as it is pressed downwardly. A similar switch 42 is provided in the bed and is actuated by the saw blade lever 12 as it is depressed.

Assume, for purposes of disclosure, that the workpiece is to be placed on the table 4 against guide 20 with the correct longitudinal edge of the workpiece against said guide for cutting off the end of the workpiece.

With the workpiece W on the table, it is a correct procedure to press or hold it snugly against the guide 20. When the correct edge of the workpiece is adjacent and pressed against the guide, tongue 26 enters groove 30 and switch 34 is actuated. Should the incorrect edge of the workpiece be pressed against the guide, tongues 28 enter grooves 32 and actuate incorrect or error switches 36.

It is assumed that the correct procedure is to press the workpiece firmly onto the table in which case the table is depressed so as to actuate correct switch 40. As the guide and workpiece are moved forwardly on the table so that the inner end of the workpiece engages and depresses the saw and lever 12, correct switch 42 is actuated.

Various steps in the operation of a saw or other machine may be established. It will be understood that it is the purpose of the invention to indicate the established procedure in the correct and incorrect placement of a workpiece in the machine. Circuit control means may be disposed to function in accordance with the procedure established.

The indicating means includes a housing 46 having a front panel 48. In one way, the panel may be transparent, such as of glass or the like. The panel may have various arrangements of color and it may carry information and facts relative to the correct and incorrect use and operation of a machine for the purpose of training in the correct operation and safe use thereof. The panel 48 may be easily and readily removed for replacement by other panels for use in connection with other model machines. For purposes of disclosure, an indicator 50 such as a light bulb is disposed behind the panel and in a compartment 52. Said indicator will be called a correct indicator or signal. A similar bulb 54 will indicate an error or incorrect placement of the workpiece and is disposed in a compartment 56 similar to compartment 52.

Means to indicate correct placement of the workpiece includes indicia such as 0, 1, 2 and 3 on the panel. An oscillatable disc 60 behind the panel and indicia has an opening 62 for the passage of light from a bulb 64 in a compartment 65 rearwardly of the disc. According to the position of the opening 62, different indicia will be illuminated. The disc is provided with teeth as shown.

The circuitry to be described in connection with Fig. 7 controls or operates the indicating means accordingly as correct or error switches are actuated by placement of the workpiece in the machine.

The disc 60 is rotatable on a shaft 70 and is urged counterclockwise by a spring 72 having one end fixed to a collar 74 fast on said shaft and its other end fixed in said disc.

A pawl 76 pivoted at 77 on a lever 78 is urged inwardly by a spring 80. The lever 78 is urged clockwise on its pivot 82 by a spring 84 around the armature 86 of a solenoid 88. As solenoid 88 is energized, the lever 78 is swung quickly counterclockwise so that the pawl 76 moves outwardly and behind the next tooth counterclockwise to that with which it has been engaged. As the lever is swung clockwise by spring 84 the pawl 76 moves the disc clockwise so that opening 62 is positioned rearwardly of another numeral of the panel thus indicating a point or a correct placement of the workpiece in the machine.

An error lever 90 pivoted at 92 has a projection 94 for engagement behind the teeth of the disc, and said lever is swung clockwise by the armature 96 of a solenoid 98 when energized. As said lever 90 so swings, an end portion 90' thereof acts on a lip 76' of pawl 76 to disengage the tooth of the disc and projection 94 is positioned for abutment by adjacent tooth of the disc as spring 72 rotates the disc counterclockwise whereby the opening 62 thereof is moved. Spring 100 around armature 96 urges lever 90 counterclockwise when solenoid 98 is deenergized.

Thus, when solenoid 88 is energized on correct placement of the workpiece in the machine, the disc is rotated clockwise one tooth to indicate a point. When solenoid 98 is energized, as when the workpiece is incorrectly placed in the machine to actuate an error switch, the disc is moved counterclockwise one tooth so as to cancel a point of the indicia.

For clarity, connections are shown to ground and a source of energy is indicated by batteries. It will be understood however that there may be a single source of energy such as a D. C. or A. C. line.

Correct switches 34, 40 and 42 are shown connected to ground. A relay 102 of the time delay type is arranged to open its contacts after solenoid 88 has had sufficient time to advance the score.

A connection 106 from the contact of switch 34 extends to a contact with which an arm 108 of relay 104 is in contact. Said arm 108 is connected by 110 to relay 104 which is connected by 112 to relay 102 which in turn is connected through battery 114 to ground. An arm 116 of relay 102 is connected by 118 to ground and a contact for said arm is connected by 120 to solenoid 88.

An arm 122 of relay 104 is connected through 122' to 124 which by 126 is connected through battery 128 to ground. A line 130 from the contact for arm 122 extends to the correct signal or indicator 50 which in turn is connected by 132 to ground.

As correct switch 34 is closed, signal 50 is energized as are relays 102 and 104. Through arm 116, the solenoid 88 is energized so that the discs 60 is operated and thereby the correct placement of the workpiece in the machine is indicated by a point on the panel.

There are relays 104' and 104" corresponding to the relay 104 for the point or correct switches 40 and 42. These are connected by 136 and 138 to 112. Connections 106' and 106" extend from switches 40 and 42 to contacts engaged by arms 108' and 108" so that, as said switches are closed, said relays 104', 104", and 102 are energized thereby operating and advancing the point indicating disc, as explained in connection with switch 34.

Arms 122' and 122" of relays 104' and 104" are connected by 142 and 144 to 124. Connections 130' and 130" connect the contacts for arms 122' and 122" to 130.

As switches 40 and 42 are closed, as well as energizing the solenoids, the signal indicator 50 is energized. There may, of course, be a separate signal indicator for each of the correct switches, if desired.

The error switch 36 is connected to ground and the contact thereof is connected by 148 to a contact for arm 150 of a relay 152. Said relay is of the hold, electromechanically reset type. Said relay 152 is connected by 154 to a relay 156 which is connected by 158 through battery 160 to ground. Relay 156 is of the time delay type and is arranged to open its contacts after solenoid 98 has performed its function.

An arm 162 of relay 156 is connected to ground and a contact for said arm is connected by 164 to the solenoid 98. Said solenoid 98 is connected by 166 through battery 168 to ground. Thus, as error switch 36 is closed, solenoid 98 is energized so that the disc is rotated one tooth counterclockwise for cancelling a correct point. A lever 170 of an electromagnet 172 is pressed downwardly by a spring 174 to lock the arm 150 in its closed position to insure energizing of solenoid 98 a sufficient time for operation of the disc in a direction to indicate an error. It keeps the error indication energized until that error has been corrected by correct switch 34.

An arm 175 of relay 152 is connected by 176 and 126 through battery 128 to ground. A contact for said arm 175 is connected by 178 to error indicating signal 54 which is connected by 180 to ground. Thus as error switch 36 is actuated, an error is indicated and the disc 60 is operated.

Lines 182 and 184 connect electromagnet 172 to lines 112 and 110 so that, on operation of correct or point switch 34, the lever is elevated so that the arm of the relay may break with its contact.

It is possible that an error switch will first be actuated by an incorrect operation of the machine so that the arm 150 will become locked. As the point switch is actuated, the arm 150 is released by lever 170 and the error indication 54 is cancelled.

It will be noted that actuation of correct or point switches results in indications of correct placement of the work piece or correct operation of a component while incorrect operation or placement or errors results in indications thereof and the cancellation of an indication representing a point.

There may be any desired number of switches so that correct and incorrect placement of the work piece in the model machine is indicated, and electromagnet 172 may be connected to various or other point or correct relays.

Additional error relays, such as 152, may be employed in combination with error switches with the unlatching means of the error relays connected to point relays, as has been explained.

As stated, various procedures may be adopted for training by means of the apparatus in connection with the model machine disclosed or many others.

The circuitry will be disposed within the housing and the model machine may be plugged into the housing for connection with the circuitry and the plug-in mechanism may be arranged for other model machines than that described.

While I have illustrated and described the invention as embodied in a specific arrangement, I do not intend to be limited to the details shown since various modifications and structural changes may be made without departing in any way from the spirit of the invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalency of the claims below.

What it is desired to claim and secure by Letters Patent of the United States is:

1. A training aid for illustrating the sequential steps in the operation of the components of a mechanism comprising, a machining apparatus, a work piece for placement in correct and incorrect positions relative to said apparatus during the performance of machining operations thereupon, switches engageable by said work piece upon placement in the correct and incorrect positions on said apparatus, signal means for indicating the correct and incorrect placement of said work piece on said apparatus, and electrical circuits including said switches and signal means.

2. In a testing apparatus of the character described, the combination of means for indicating a response to a person being tested, switch mechanism operable by a person, electrically operated response recording mechanism, means for visibly indicating the correct and incorrect responses of the person during the training period, and means for rendering said response indicating means ineffective and for rendering said recording mechanism operative during the test period.

3. In a training aid of the type for testing the correct and incorrect sequential steps taken by an operator in the operation of an apparatus comprising, an apparatus including at least one component and interconnecting means between said apparatus and the component whereby the component is movable between two positions relative to said apparatus, means for correctly and incorrectly moving the movable component of said apparatus during the operation thereof, energizing means, an electrically operated signal device combined with said movable means, an open circuit between said energizing means and signal device, circuit closing means controllable by said movable means for energizing said signal device and indicating the correct and incorrect movement of the component of said apparatus.

4. A training aid for illustrating a machining apparatus and the sequential correct and incorrect steps in the operation of its components comprising, a machining mechanism, material to be machined, said material embodying elements for indicating correct and incorrect steps and the correct and incorrect sequence thereof in the machining apparatus performed thereon, and electrical circuits including switches and signal means indicating the correct and incorrect machining operations on said material.

5. A training device of the class described comprising, machining apparatus having movable and stationary components, a work piece for placement relative to said components in correct and incorrect positions, electrically operated signal means for indicating the correct and incorrect positions of said work piece, a source of energy, and connections between said signal means and source of energy including switches engageable and operable by said work piece in the correct and incorrect positions of said work piece relative to said machining apparatus for the energization of the respective correct and incorrect signal means.

6. Training aid apparatus of the type described to indicate the correct and incorrect operation of a machine and to score the same comprising, a model machine having components engageable by a work piece, electrically operated mechanism to visually indicate correct and incorrect relative postions of a work piece and the components of said machine, a work piece, correct and incorrect switches carried by the components of said machine, the components of said machine and said work piece being arranged for operation of said switches in correct and incorrect positions of said work piece and the components of said machine relative to each other, and circuit means connecting said switch means and electrically operated mechanism and source of energy.

7. Training aid apparatus of the class described for indicating correct and incorrect operation and correct and incorrect sequence of operations of a machine comprising, a model machine having related components engageable by a work piece, a manually engageable work piece, an electrically operated unit separate from said model machine and work piece being adapted and arranged to visually indicate correct and incorrect engagement of said work piece and components of said model machine and correct and incorrect sequence of said work piece and components, switch means, said components and work piece arranged for operating said switch means in correct and incorrect engaged relative positions of said work piece and components, and circuit means including said electrically operated unit and switch means for connection to a source of energy.

8. Training apparatus as set forth in claim 7 wherein said circuit means includes separable connections.

(References on following page)

References Cited in the file of this patent

UNITED STATES PATENTS

| | | |
|---|---|---|
| 564,392 | Peck | July 21, 1896 |
| 1,564,138 | Rowland | Dec. 1, 1925 |
| 2,084,440 | Heinis | June 22, 1937 |
| 2,175,944 | McGrath | Oct. 10, 1939 |
| 2,260,432 | Brown | Oct. 28, 1941 |
| 2,349,066 | Witter | May 16, 1944 |
| 2,416,959 | Segal | Mar. 4, 1947 |
| 2,539,077 | Hawkins | Jan. 23, 1951 |